United States Patent
Kosugi et al.

(10) Patent No.: US 10,752,177 B2
(45) Date of Patent: Aug. 25, 2020

(54) VEHICULAR VISUAL RECOGNITION DEVICE AND VEHICULAR VISUAL RECOGNITION IMAGE DISPLAY METHOD

(71) Applicant: KABUSHIKI KAISHA TOKAI-RIKA-DENKI-SEISAKUSHO, Aichi-ken (JP)

(72) Inventors: Masanori Kosugi, Aichi-ken (JP); Takashi Nagao, Aichi-ken (JP); Tetsuya Egawa, Aichi-ken (JP); Takuya Hayashi, Aichi-ken (JP); Naofumi Kato, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 0 days.

(21) Appl. No.: 15/706,906

(22) Filed: Sep. 18, 2017

(65) Prior Publication Data
US 2018/0086271 A1 Mar. 29, 2018

(30) Foreign Application Priority Data
Sep. 27, 2016 (JP) .................................. 2016-188401

(51) Int. Cl.
*B60R 1/12* (2006.01)
*H04N 5/232* (2006.01)
(Continued)

(52) U.S. Cl.
CPC .............. *B60R 1/12* (2013.01); *G06T 11/00* (2013.01); *H04N 5/23238* (2013.01);
(Continued)

(58) Field of Classification Search
CPC .............. B60R 1/12; B60R 2001/1253; B60R 2300/105; B60R 2300/303; B60R 2300/304; B60R 2300/8006; B60R 2300/8046; B60R 2300/8066; F16D 2041/0605; F16D 41/067; G06T 11/00;
(Continued)

(56) References Cited

U.S. PATENT DOCUMENTS

2016/0042543 A1* 2/2016 Hashimoto ............... B60R 1/00
345/629
2016/0325677 A1* 11/2016 Fitch ........................ B60R 1/04
(Continued)

FOREIGN PATENT DOCUMENTS

| JP | 2010-109684 A | 5/2010 |
| JP | 5500877 B2 | 5/2014 |
| JP | 2014-200018 A | 10/2014 |

*Primary Examiner* — Mohammed Jebari
(74) *Attorney, Agent, or Firm* — Roberts Calderon Safran & Cole P.C.

(57) ABSTRACT

A vehicular visual recognition device, including: an imaging section that, from outside a vehicle, captures plural vehicle exterior capture images in which portions of the images overlap with each other; and a controller that effects control such that an image of a vehicle body portion of a vehicle cabin image set to a predetermined transmissive state overlaps with at least part of an overlapping portion of the plural vehicle exterior capture images, and such that the plural vehicle exterior capture images and the vehicle cabin image are combined and displayed at a display section.

12 Claims, 7 Drawing Sheets

(51) Int. Cl.
　　　*H04N 5/445*　　　(2011.01)
　　　*H04N 7/18*　　　(2006.01)
　　　*G06T 11/00*　　　(2006.01)

(52) U.S. Cl.
　　　CPC ......... *H04N 5/44504* (2013.01); *H04N 7/181* (2013.01); *B60R 2001/1253* (2013.01); *B60R 2300/105* (2013.01); *B60R 2300/303* (2013.01); *B60R 2300/304* (2013.01); *B60R 2300/8006* (2013.01); *B60R 2300/8046* (2013.01); *B60R 2300/8066* (2013.01); *H04N 5/23293* (2013.01)

(58) Field of Classification Search
　　　CPC ........... H04N 5/23238; H04N 5/23293; H04N 5/44504; H04N 7/181
　　　USPC ........................................................ 348/148
　　　See application file for complete search history.

(56) References Cited

U.S. PATENT DOCUMENTS

| | | | | |
|---|---|---|---|---|
| 2016/0358355 | A1* | 12/2016 | Lin et al. ................. | G06T 11/60 |
| 2017/0323427 | A1* | 11/2017 | Jiang ........................ | G06T 7/13 |
| 2018/0056870 | A1* | 3/2018 | Kosugi .................... | B60R 1/00 |
| 2018/0288401 | A1* | 10/2018 | Eshima .................. | H04N 5/225 |

\* cited by examiner

VEHICULAR VISUAL RECOGNITION DEVICE AND VEHICULAR VISUAL RECOGNITION IMAGE DISPLAY METHOD

CROSS-REFERENCE TO RELATED APPLICATION

This application is based on and claims priority under 35 USC 119 from Japanese Patent Application No. 2016-188401 filed on Sep. 27, 2016, the disclosure of which is incorporated by reference herein.

BACKGROUND

Technical Field

The present disclosure relates to a vehicular visual recognition device and a vehicular visual recognition image display method that assist visual recognition by an occupant of a vehicle.

Related Art

An onboard image display device, for example, the onboard image display device described in Japanese Patent Number 5500877, is provided with imaging cameras at a vehicle width direction central portion of a vehicle rear section and to each of left-right door mirrors of an automobile to image rearward of the vehicle, and with a display. Image data captured by the imaging cameras is combined and displayed on a display. Further, the onboard image display device is provided with a sensor that detects a rearward vehicle present rearward of the vehicle itself. The onboard image display device is configured such that when a vehicle rearward of the vehicle itself is detected by a sensor, the vehicle detected rearward of the vehicle itself is trimmed while allowing the image combination boundary where image data is combined to vary, and then displayed on the display.

However, in cases in which plural items of image data have been combined and displayed on the display as if viewed from a hypothetical viewpoint, the image is distorted at a boundary position for combining the images. This is detrimental on the appearance of the image displayed on the display.

SUMMARY

The present disclosure is arrived at in consideration of these circumstances, and has an object of providing a vehicular visual recognition device and a vehicular visual recognition image display method capable of suppressing detrimental effects on the appearance of an image to be displayed.

A vehicular visual recognition device of a first aspect includes an imaging section that from outside a vehicle captures plural vehicle exterior capture images in which portions of the images overlap with each other, and a controller that controls such that an image of a vehicle body portion of a vehicle cabin image set to a predetermined transmissive state overlaps with at least part of an overlapping portion of the plural vehicle exterior capture images, and such that the plural vehicle exterior capture images and the vehicle cabin image are combined and displayed at a display section.

An imaging section is included that from outside a vehicle captures plural vehicle exterior capture images in which portions of the images overlap with each other. A controller is included that controls so that the vehicle cabin interior is captured in a direction corresponding to the imaging direction of the imaging section so as to include window glass and a portion of a vehicle body, and so that the plural vehicle exterior capture images and the vehicle cabin image are combined and displayed at a display section such that the image of the vehicle body portion of the vehicle cabin image set to a predetermined transmissive state and at least part of the overlapping portion of the plural vehicle exterior capture images overlap with each other.

In the vehicular visual recognition device of the first aspect, plural vehicle exterior capture images captured by the imaging section from outside the vehicle are combined with the vehicle cabin image. Further, in the vehicle cabin image, images of vehicle body portions of the cabin interior are respectively set to predetermined transmissive states and the vehicle exterior capture images are made visible through images of vehicle body portions.

The image displayed at the display section is an image in which the plural vehicle exterior capture images and the vehicle cabin image are combined by overlapping at an overlapping portion where the plural vehicle exterior capture images overlap with each other, such that at least part of the image of the vehicle body portion of the vehicle cabin image overlaps with the overlapping portion of the outside-vehicle-captured image.

Thus, in the image displayed at the display section, the image of the vehicle body portion in the vehicle cabin image overlaps with at least part of the overlapping portion of the outside-vehicle images. Accordingly, the image of the overlapping portion of the vehicle exterior capture images overlapped by the image of the vehicle body portion is difficult to discern, enabling a detrimental effect on the appearance of the image displayed at the display section to be suppressed.

A vehicular visual recognition device of a second aspect is the vehicular visual recognition device of the first aspect, wherein, in the vehicle cabin image, a vehicle cabin interior is configured to be captured in a direction corresponding to a capture direction of the imaging section so as to include window glass and a portion of a vehicle body.

In the vehicular visual recognition device of the second aspect, the captured image of the cabin interior captured in the direction corresponding to the capture direction of the imaging section so as to include the window glass and the portion of the vehicle body is employed as the vehicle cabin image. This enables the state of the cabin interior to be displayed at the display section together with the outside-vehicle-captured image.

A vehicular visual recognition device of a third aspect is the vehicular visual recognition device of the first aspect, wherein, in the vehicle cabin image, a transmissivity of an image of the vehicle body portion is configured to be set lower than a transmissivity of an image of surroundings of the vehicle body portion.

In the vehicular visual recognition device of the third aspect, the transmissivity of the image of the vehicle body portion overlapping with the overlapping portion of the vehicle exterior capture images is set lower than the transmissivity of the image of the surroundings thereof. The image of the vehicle body portion where the transmissivity is lowered is darker than the image of the surroundings thereof, enabling the image of the overlapping portion of the vehicle exterior capture images to be made difficult to discern and enabling detrimental effects on the appearance of the image displayed at the display section to be suppressed.

A vehicular visual recognition device of a fourth aspect is the vehicular visual recognition device of the first aspect, wherein an image of the vehicle body portion of the vehicle cabin image is configured to be overlapped with an entire area along an up-down direction of an overlapping portion of the vehicle exterior capture images.

In the vehicular visual recognition device of the fourth aspect, the image of the vehicle body portion of the vehicle cabin image overlaps with the entire area along an up-down direction of overlapping portion of the vehicle exterior capture images. This enables the image of the overlapping portion of the vehicle exterior capture images to be made difficult to discern and enables the detrimental effects on the appearance of the image displayed at the display section to be suppressed.

A vehicular visual recognition device of a fifth aspect is the vehicular visual recognition device of the first aspect, wherein an image of the vehicle body portion is configured to be an image of a pillar in contact with window glass.

In the vehicular visual recognition device of the fifth aspect, the image of the pillar overlaps with each of the overlapping portions of the vehicle exterior capture images. The pillar is provided along an up-down direction between a vehicle ceiling of a vehicle body lower portion. Since the image of the pillar and the image of the overlapping portion of the vehicle exterior capture images overlap with each other, the image of the vehicle body portion overlaps with the entire area along the up-down direction of the image of the overlapping portion of the vehicle exterior capture images. This enables the image of the overlapping portion of the vehicle exterior capture images to be made difficult to discern and enables detrimental effects on the appearance of the image displayed at the display section to be suppressed.

A vehicular visual recognition device of a sixth aspect, is the vehicular visual recognition device of the fifth aspect, wherein an image of the pillar is configured to be overlapped with an entire area along a direction intersecting an up-down direction of an overlapping portion of the vehicle exterior capture images.

In the vehicular visual recognition device of the sixth aspect, the width of the overlapping portion of the vehicle exterior capture images (a dimension in a direction intersecting the up-down direction) is matched to the width (vehicle width direction dimension) of the image of the pillar in the vehicle cabin image. Thus, the image of the overlapping portion of the vehicle exterior capture images can be suppressed from sticking out from the image of the pillar into a window glass portion, enabling detrimental effects on the appearance of the image displayed at the display section to be suppressed.

A vehicular visual recognition device of a seventh aspect, is the vehicular visual recognition device of the first aspect, wherein, in the vehicle cabin image, a transmissivity of an image of the vehicle body portion further to an upper side than an up-down direction intermediate portion of the vehicle cabin image is configured to be set higher than a transmissivity of an image of the vehicle body portion further to a lower side than the up-down direction intermediate portion of the vehicle cabin image.

In the vehicular visual recognition device of a seventh aspect, the transmissivity of the image of the vehicle body portion further to the upper side than the up-down direction intermediate portion of the vehicle cabin image is set higher than the transmissivity of the image of the vehicle body portion further to the lower side than the up-down direction intermediate portion of the vehicle cabin image. Although clouds (the sky) and the like can be seen at the upper side of the vehicle, even if distortion occurs in images of clouds this does not influence the appearance of the image displayed at the display section, enabling detrimental effects to the image displayed at the display section to be suppressed.

A vehicular visual recognition device of an eighth aspect, is the vehicular visual recognition device of the first aspect, wherein the controller controls such that the vehicle cabin image and the plural vehicle exterior capture images are displayed at the display section as images that are left-right inverted with respect to captured images.

In the vehicular visual recognition device of the eighth aspect, when, for example, an occupant is aboard, the occupant appears in the vehicle cabin image as an image that has been left-right inverted. This enables a disturbed feeling due to the left-right position of the occupant aboard being different from the left-right position of the display section to be suppressed from arising.

A vehicular visual recognition device of a ninth aspect, is the vehicular visual recognition device of the eighth aspect, wherein the display section is an interior rearview mirror provided in a cabin, and the controller controls so as to display while positionally aligning at the display section a position of an object in a rearward field of view reflected when the interior rearview mirror is not displaying the vehicle cabin image and the plural vehicle exterior capture images, with a position of the object on the image displayed when the interior rearview mirror is displaying the vehicle cabin image and the plural vehicle exterior capture images.

In the vehicular visual recognition device of the ninth aspect, the position of the object in the rearward field of view reflected by the interior rearview mirror is not offset from the position of the object in displayed images. This enables a disturbed feeling to be suppressed from arising when, for example, the onboard position of the occupant and the position on the display are different.

A vehicular visual recognition image display method of a tenth aspect includes imaging from outside a vehicle plural vehicle exterior capture images in which portions of the images overlap with each other using an imaging section, generating a vehicle cabin image in a predetermined transmissive state, generating a combined image that is the plural vehicle exterior capture images and the vehicle cabin image combined at a combination portion such that an image of a vehicle body portion of the vehicle cabin image and at least part of an overlapping portion of the plural vehicle exterior capture images overlap with each other, and displaying the combined image at a display section.

In the vehicular visual recognition image display method of the tenth aspect, a vehicle cabin image is generated in which each image of the vehicle body portion is in a predetermined transmissive state. The transmissive state of the image of the vehicle body portion can be set to a transmissive state in which the vehicle exterior capture images are visible through the vehicle cabin image (the image of the vehicle body portion) when the vehicle cabin image and the plural vehicle exterior capture images are overlapped. The combination portion is set as a portion where at least part of the overlapping portion of the vehicle exterior capture images overlaps with the image of the vehicle body portion in the vehicle cabin image. The combined image is generated in the combination portion by combining adjacent vehicle exterior capture images and the vehicle cabin interior image, and is displayed at the display section.

Thus, in the combined image, the image of the vehicle body portion of the vehicle cabin image is overlapped with at least part of the overlapping portion of the vehicle exterior capture images. This makes the image of the overlapping portion of the vehicle exterior capture images overlapped by the image of the vehicle body portion difficult to discern, and enabling detrimental effects on the appearance of the combined image to be suppressed.

As described above, detrimental effects on the appearance of the image to be displayed can be suppressed in the vehicular visual recognition device and the vehicular visual recognition image display method according to the present disclosure.

BRIEF DESCRIPTION OF DRAWINGS

Exemplary embodiments of the present disclosure will be described in detail based on the following figures, wherein.

DESCRIPTION OF EMBODIMENTS

An exemplary embodiment of the present disclosure is described in detail below, with reference to the drawings.

Figure 1:
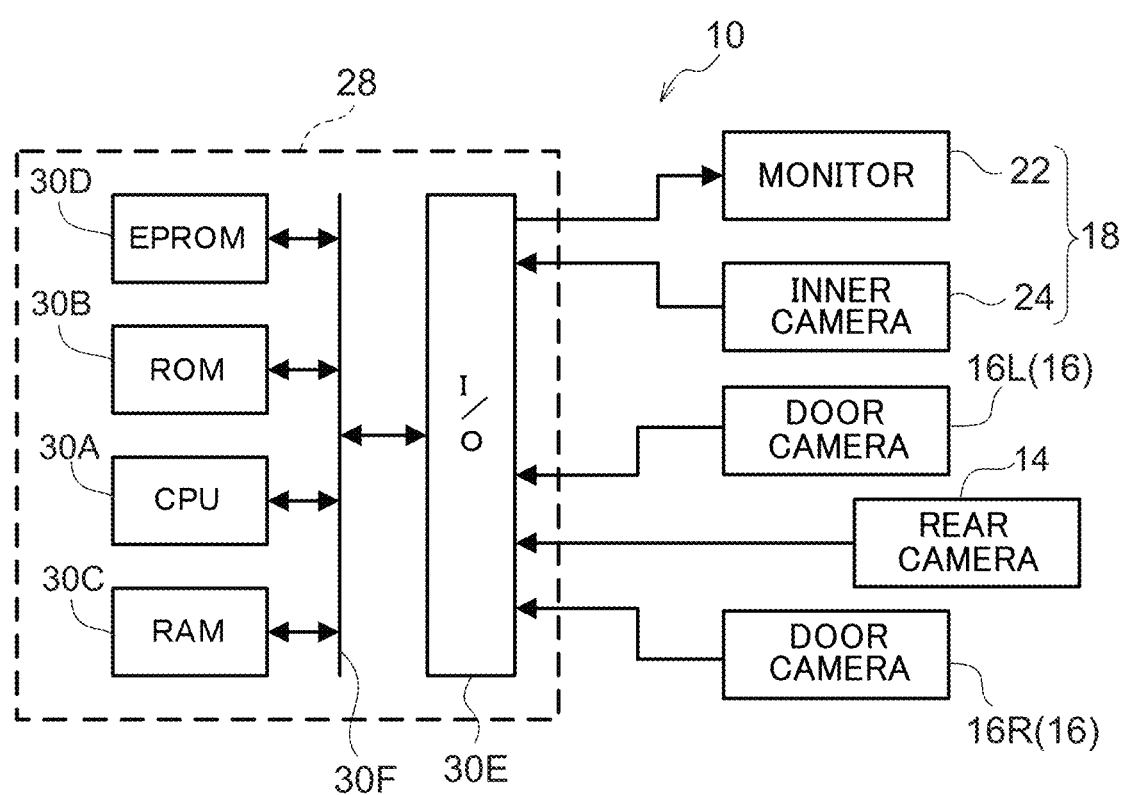
FIG. 1 is a block diagram illustrating a vehicular visual recognition device according to an exemplary embodiment of the present disclosure.
Figure 2A:
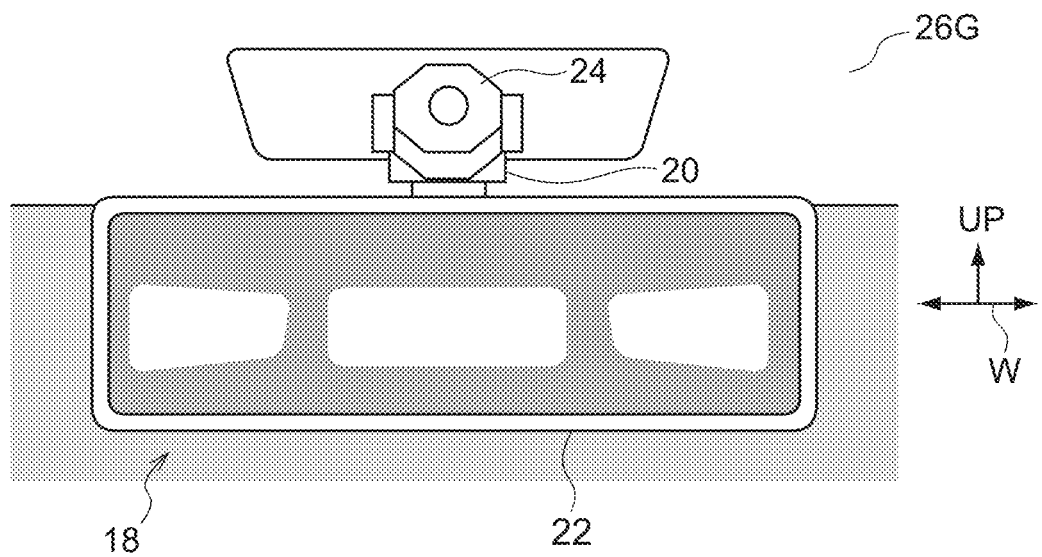
FIG. 2A is a face-on view illustrating an interior rearview mirror in a vehicle cabin, as viewed from a rear side of a vehicle.
Figure 2B:
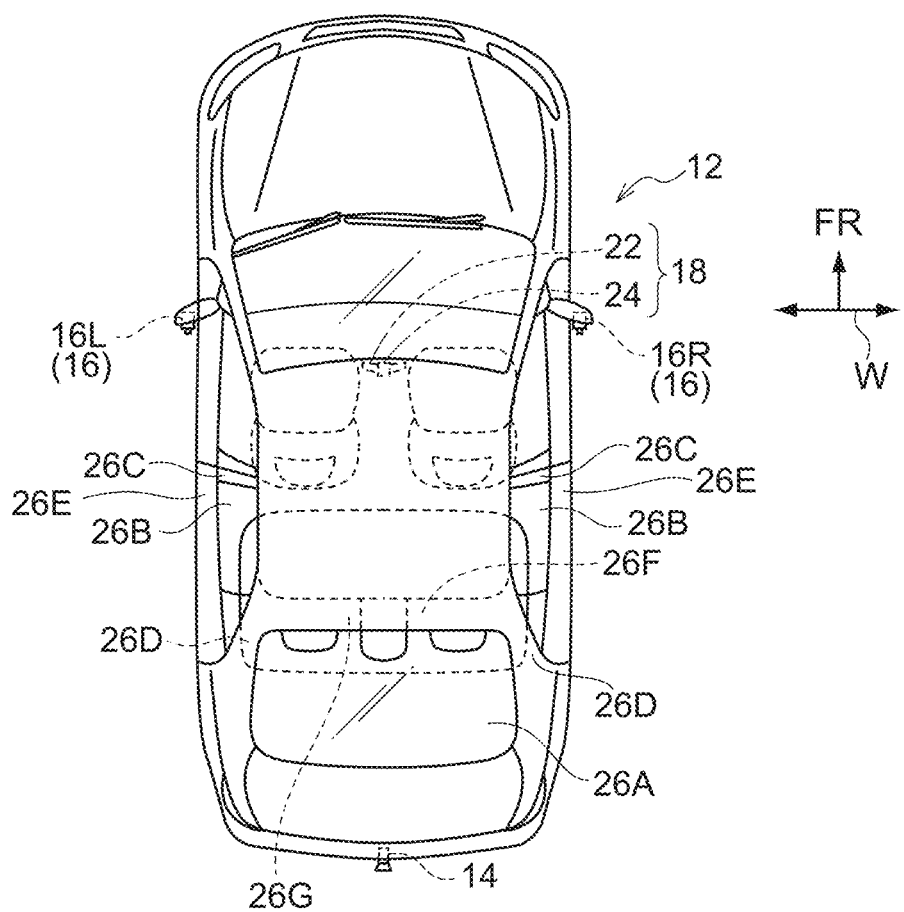
FIG. 2B is a plan view of a vehicle as viewed from above.

FIG. 1 illustrates a schematic configuration of a vehicular visual recognition device 10 according to the present exemplary embodiment as a block diagram. Further, FIG. 2A illustrates relevant components inside a vehicle cabin of a vehicle 12 as viewed from a vehicle rear side as a face-on view, and FIG. 2B illustrates the vehicle 12 provided with the vehicular visual recognition device 10 as a plan view viewed from above. Note that in each of the drawings, the vehicle front side is indicated by an arrow FR, the vehicle width direction is indicated by an arrow W, and the upper side is indicated by an arrow UP.

The vehicular visual recognition device 10 includes a rear camera 14 and door cameras 16L and 16R serving as imaging sections. The rear camera 14 is disposed at a vehicle width direction central portion of a vehicle rear section (for example, a vehicle width direction central portion of a rear bumper) and is capable of imaging rearward of the vehicle 12 over a predetermined viewing angle (imaging region). Further, the door camera 16L is provided to a vehicle width left side door mirror of the vehicle 12 and the door camera 16R is provided to a vehicle width right side door mirror of the vehicle 12. The door cameras 16L and 16R are capable of imaging rearward of the vehicle from the vehicle body sides over a predetermined viewing angle (imaging region).

Portions of the imaging region of the rear camera 14 overlap with portions of the imaging regions of the door cameras 16L and 16R, enabling rearward of the vehicle to be imaged by the rear camera 14 and the door cameras 16L and 16R over a range spanning from obliquely to the right and rear of the vehicle body to obliquely to the left and rear. Rearward of the vehicle 12 is thereby captured over a wide angle.

An interior rearview mirror 18 is provided in the vehicle cabin of the vehicle 12, and a base portion of a bracket 20 of the interior rearview mirror 18 is attached to a vehicle width direction central portion at a vehicle front side of a vehicle cabin interior ceiling face. A monitor 22 that has an elongated rectangular shape and that serves as a display section is provided on the bracket 20. The monitor 22 is attached to a lower end portion of the bracket 20 such that the longitudinal direction of the monitor 22 is the vehicle width direction and the display screen of the monitor 22 faces the vehicle rear. Accordingly, the monitor 22 is disposed in the vicinity of an upper portion of the front windshield glass at the vehicle front side, making the display screen viewable by an occupant in the vehicle cabin.

The display screen of the monitor 22 is a curved surface having a convex shape facing toward the vehicle rear. Further, a half mirror (wide mirror) is provided to the display screen of the monitor 22, and when the monitor 22 is not displaying, the vehicle cabin interior and a rearward field of view passing through the rear window glass and the door glass are reflected in the half mirror.

An inner camera 24 serving as a vehicle cabin imaging section is provided on the bracket 20, and the inner camera 24 is fixed to the bracket 20 at the upper side of the monitor 22 (the vehicle cabin interior ceiling side). The imaging direction of the inner camera 24 faces toward the vehicle rear and the inner camera 24 images the vehicle cabin interior and rearward of the vehicle from the vehicle front side.

Rear window glass 26A and door glass 26B of a side door, which serve as window glass, are included in the imaging region of the inner camera 24, enabling imaging regions of the rear camera 14 and the door cameras 16L and 16R to be captured through the rear window glass 26A and the door glass 26B. Further, a center pillar 26C, rear pillars 26D, rear side doors 26E, a rear seat 26F, a vehicle cabin interior ceiling 26Q and the like, which serve as vehicle body components visible inside the vehicle cabin, are included in the imaging region of the inner camera 24. Note that a front seat may also be included in the imaging region of the inner camera 24.

Moreover, a control device 28, serving as a controller, is provided to the vehicular visual recognition device 10. The rear camera 14, the door cameras 16L and 16R, the monitor 22, and the inner camera 24 are connected to the control device 28. The control device 28 includes a microcomputer in which a CPU 30A, ROM 30B, RAM 30C, a non-volatile storage medium (for example, EPROM) 30D, and an I/O section (an input/output interface) 30E are connected to one another by a bus 30F. Various programs such as a vehiclar visual recognition display control program are stored in the ROM 30B or the like, and the control device 28 displays images to assist visual recognition by an occupant on the monitor 22 by the CPU 30A reading and executing the programs stored in the ROM 30B or the like.

The control device 28 generates an outside-vehicle image by overlapping vehicle exterior capture images respectively captured by the rear camera 14 and the door cameras 16L and 16R. Further, the control device 28 generates a vehicle cabin image from the captured images captured by the inner camera 24. Furthermore, the control device 28 overlaps the outside-vehicle image and the vehicle cabin image with each other, generates a combined image for display, and controls such that the combined image is displayed on the monitor 22. Note that the monitor 22 is provided further to the vehicle front side than the driver seat and the image displayed on the monitor 22 is left-right inverted with respect to the captured images.

At this stage the rear camera 14, the door cameras 16L and 16R, and the inner camera 24 have captured images with different viewpoint positions from each other. The control device 28 then performs viewpoint conversion processing to align the viewpoint positions of each of the captured images from the rear camera 14, the door cameras 16L and 16R, and the inner camera 24. In the viewpoint conversion processing, a hypothetical viewpoint is set further to the vehicle front side than the center position of the monitor 22 (an intermediate position in the vehicle width direction and the up-down direction), and the captured images from the rear camera 14, the door camera 16L, the door camera 16R, and the inner camera 24 are each converted into images as viewed from the hypothetical viewpoint. When the viewpoint conversion processing is performed, as well as setting the hypothetical viewpoint, a hypothetical screen is set at the vehicle rear. The hypothetical screen may be a flat surface, but is preferably a curved surface having a convex shape on the vehicle rearward direction side (a curved surface having a concave shape as viewed from the vehicle). The viewpoint conversion processing applies a freely selected method of converting each captured image into an image projected onto the hypothetical screen as viewed from the hypothetical viewpoint.

As a result of performing the viewpoint conversion processing using the same hypothetical viewpoint and hypothetical screen, the same object seen in different captured images appears overlapping with itself in each of the captured images. Namely, supposing that an object seen beyond the rear window glass 26A and the door glass 26B in the captured image from the inner camera 24 were also seen in the captured images from the rear camera 14 and the door cameras 16L and 16R, the images of the object would appear overlapping one another. The control device 28 performs trimming processing on each of the captured images from the rear camera 14, the door camera 16L, and the door camera 16R after performing the viewpoint conversion processing, and extracts images of regions to be displayed on the monitor 22.

Figure 3A:
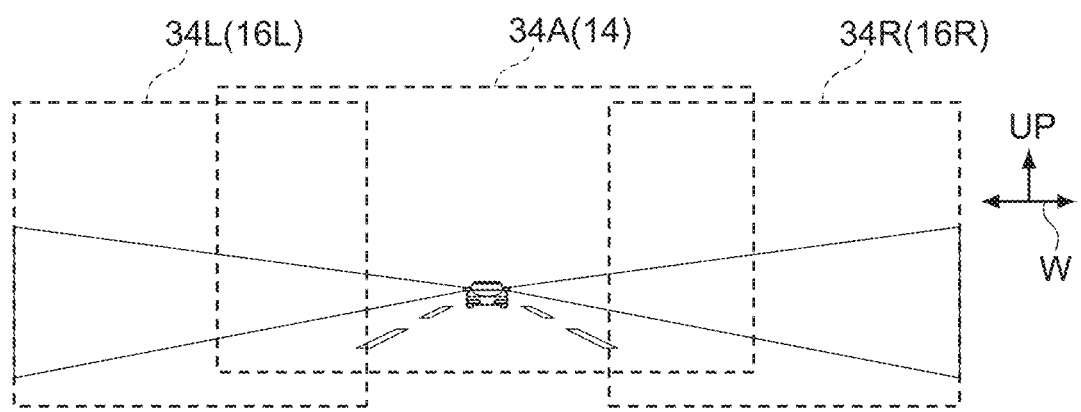
FIG. 3A is a schematic diagram illustrating vehicle exterior capture images.
Figure 3B:
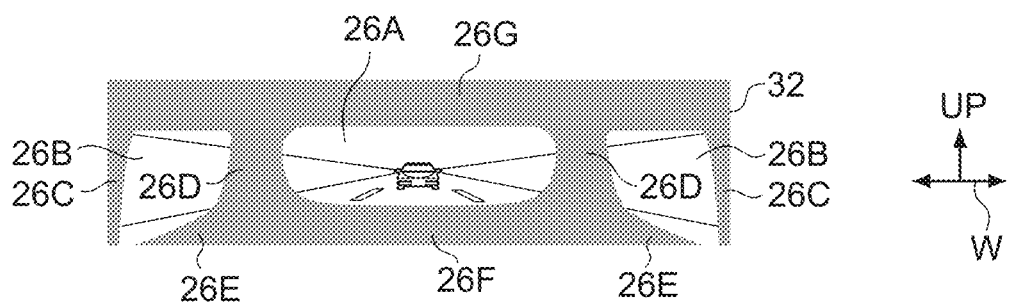
FIG. 3B is a schematic diagram illustrating a vehicle cabin image.
Figure 3C:
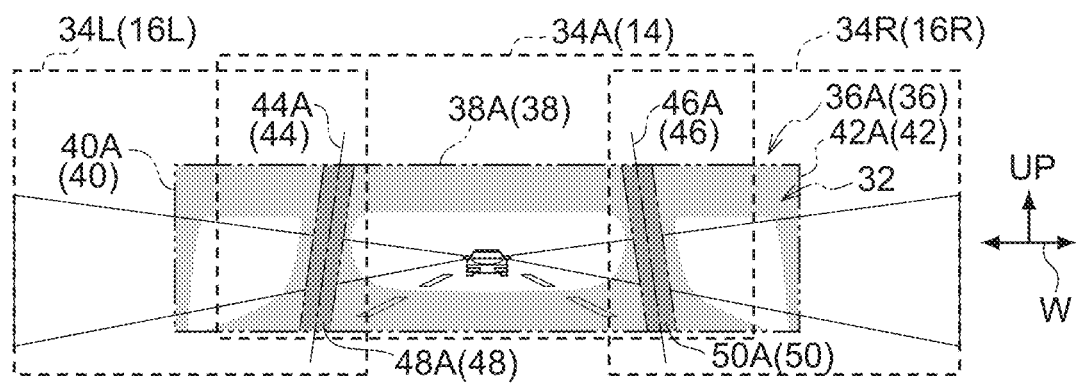
FIG. 3C and FIG. 3D are schematic diagrams illustrating extracted images respectively extracted from vehicle exterior capture images.
Figure 3D:
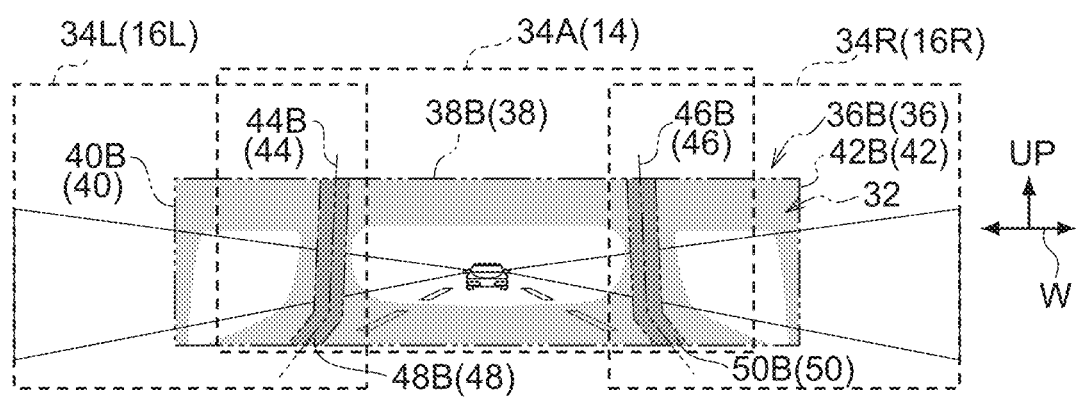

FIG. 3A illustrates a schematic diagram of captured images after the viewpoint conversion processing has been performed on the images captured by the rear camera 14 and the door cameras 16L and 16R. FIG. 3B illustrates a schematic diagram of a vehicle cabin image obtained from a captured image after the viewpoint conversion processing has been performed on the image captured by the inner camera 24. Further, FIG. 3C and FIG. 3D illustrate schematic diagrams of extraction regions (extracted images) extracted from each of the captured images from the rear camera 14 and the door cameras 16L and 16R. Note that the vehicle cabin image of FIG. 3B is illustrated overlapped in FIG. 3C and FIG. 3D. Further, the shape of each captured image is illustrated as being rectangular as an example.

A vehicle cabin image 32 illustrated in FIG. 3B employs a captured image (video) captured from the vehicle front side inside the vehicle cabin by the inner camera 24 and imaging the vehicle rear side of the vehicle cabin interior, and the vehicle cabin image 32 is obtained by performing viewpoint conversion processing on the captured image. Images of outside the vehicle as viewed through the rear window glass 26A and the door glass 26B are included in the vehicle cabin image 32. Further, images of vehicle body portions such as the center pillar 26C, the rear pillars 26D, the rear side doors 26E, the rear seat 26F, and the vehicle cabin interior ceiling 26G are included in the vehicle cabin image 32.

As illustrated in FIG. 3A, a captured image 34A from the rear camera 14 is a vehicle rearward image of a region along the vehicle width direction. Further, a captured image 34L from the door camera 16L is an image of a region at the left side of the captured image 34A viewed from the vehicle 12, and a captured image 34R from the door camera 16R is an image of a region at the right side of the captured image 34A viewed from the vehicle 12. A portion of the image at the vehicle width left side of the captured image 34A overlaps with the captured image 34L, and a portion of the image at the vehicle width right side of the captured image 34A overlaps with the captured image 34R.

The control device 28 extracts an image of a region to be displayed as the vehicle cabin image 32 on the monitor 22 by performing trimming processing on the captured image from the inner camera 24. Further, in the control device 28, the transmissivity of the vehicle cabin image 32 is set and image conversion is performed such that the vehicle cabin image 32 has the set transmissivity. The vehicle cabin image 32 has increased the transmissivity such that the transparency increases, raising the transmittance, making the image appear faint (appears to fade) compared to cases in which the transmissivity is low. In the control device 28, a transmissivity is set for the vehicle cabin image 32 so as to make an outside-vehicle image 36, described below, visible in the combined image. Further, in the control device 28, the transmissivity in the vehicle cabin image 32 is set lower (the image looks darker) for an image of the rear pillars 26D, portions of an image of the vehicle cabin interior ceiling 26G at the upper side of the rear pillars 26D, and portions of an image of the rear seat 26F at the lower side of the rear pillars 26D, these being images of vehicle body portions overlapping with combination portions, than for images of other vehicle body portions.

Note that the transmissivities of the images of the rear window glass 26A and the door glass 26B may be 100% (totally transmissive), or may be transmissivities similar to the transmissivity of images of the vehicle body portions other than the rear pillars 26D. Further, in the present exemplary embodiment, as images of vehicle body components set with a low transmissivity, in addition to the rear pillars 26D, portions of the image of the vehicle cabin interior ceiling 26G at the upper side of the rear pillars 26D, and portions of images of the rear side doors 26E and the rear seat 26F at the lower side of the rear pillars 26D are also included.

The control device 28 performs trimming processing on the respective captured images 34A, 34L, and 34R from the rear camera 14, the door camera 16L, and the door camera 16R and extracts an image of a region to be displayed on the monitor 22.

Here, a hypothetical boundary line 44 is set between an extracted image 38 extracted from the captured image 34A and an extracted image 40 extracted from the captured image 34L, and a hypothetical boundary line 46 is set between the extracted image 38 extracted from the captured image 34A and an extracted image 42 extracted from the captured image 34R. Further, in the control device 28, regions having predetermined widths are set on each side of the boundary lines 44 and 46 as combination regions 48 and 50 that serve as combination portions and overlapping portions.

The boundary lines 44 and 46 are not limited to being straight lines set in positions overlapping the rear pillars 26D in the vehicle cabin image 32; as long as at least part of the boundary lines 44 and 46 overlap images of vehicle body portions other than the rear window glass 26A and the door glass 26B in the vehicle cabin image 32, the boundary lines 44 and 46 may be curved into curved lines or may be bent. FIG. 3C illustrates a case in which straight line shaped boundary lines 44A and 46A are employed as the boundary lines 44 and 46, and FIG. 3D illustrates a case in which bent boundary lines 44B and 46B are employed as the boundary lines 44 and 46.

As illustrated in FIG. 3C, the boundary line 44A is set in the vehicle cabin image 32 at a position overlapping the rear pillar 26D at the vehicle width left side and the boundary line 46A is set in the vehicle cabin image 32 at a position overlapping the rear pillar 26D at the vehicle width right side. The vehicle width direction positions of the boundary lines 44A and 46A are positions substantially at the center of the rear pillars 26D on the vehicle cabin image 32.

A combination region 48A (48) is centered on the boundary line 44A and a combination region 50A (50) is centered on the boundary line 46A. Further, the widths (vehicle width direction dimensions) of the combination regions 48A and 50A in the vehicle cabin image 32 are either substantially the same as the width (vehicle width direction dimension) of the image of the rear pillars 26D or narrower than the width of the image of the rear pillars 26D.

In the extracted image 38A (38), a region spanning from the combination region 48A to the combination region 50A (including the combination regions 48A and 50A) is extracted from the captured image 34A. Further, an extracted image 40A extending as far as the combination region 48A (including the combination region 48A) on the extracted image 38A side is extracted from the captured image 34L, and an extracted image 42A extending to the combination region 50A (including the combination region 50A) on the extracted image 38A side is extracted from the captured image 34R. The extracted images 38A, 40A, and 42A are combined by overlapping the combination regions 48A and 50A with each other. This generates an outside-vehicle image 36A (36) of the extracted images 38A, 40A, and 42A stitched together at the combination regions 48A and 50A.

The boundary lines 44B and 46B illustrated FIG. 3D are set in the vehicle cabin image 32 at positions overlapping with the image of the rear pillars 26D, and the boundary lines 44B and 46B bend toward the vehicle front side such that their lower sides overlap the images of the rear side doors 26E. Further, a combination region 48B (48) is centered on the boundary line 44B and a combination region 50B (50) is centered on the boundary line 46B. The widths of the combination regions 48B and 50B are such that the portions overlapping with the image of the rear pillars 26D in the vehicle cabin image 32 are either substantially the same as the width of the image of the rear pillars 26D or narrower than the width of the image of the rear pillars 26D.

An extracted image 38B (38) is a region spanning from the combination region 48B to the combination region 50B (including the combination regions 48B and 50B) extracted from the captured image 34A. Further, an extracted image 40B extending to the combination region 48B (including the combination region 48B) on the extracted image 38B side is extracted from the captured image 34L, and an extracted image 42B extending to the combination region 50B (including the combination region 50B) on the extracted image 38B side and is extracted from the captured image 34R. The extracted images 38B, 40B, and 42B are combined by overlapping the combination regions 48B and 50B with each other. This generates an outside-vehicle image 36B (36) in which the extracted images 38B, 40B, and 42B are stitched together at the combination regions 48A and 50A.

Further, the control device 28 generates a combined image by overlapping the combination regions 48 and 50 of the outside-vehicle image 36 (36A and 36B) with the image of the vehicle body portion of the vehicle cabin image 32 (the image of the rear pillars 26D), and by combining the outside-vehicle image 36 with the vehicle cabin image 32. Namely, in the combined image, the extracted images 38, 40, and 42 are overlapped (combined) and stitched together at the combination regions 48 and 50, the images of the rear pillars 26D of the vehicle cabin image 32 are overlapped on the combination regions 48 and 50, and the extracted images 38, 40, and 42 and the vehicle cabin image 32 are combined.

Figure 4:
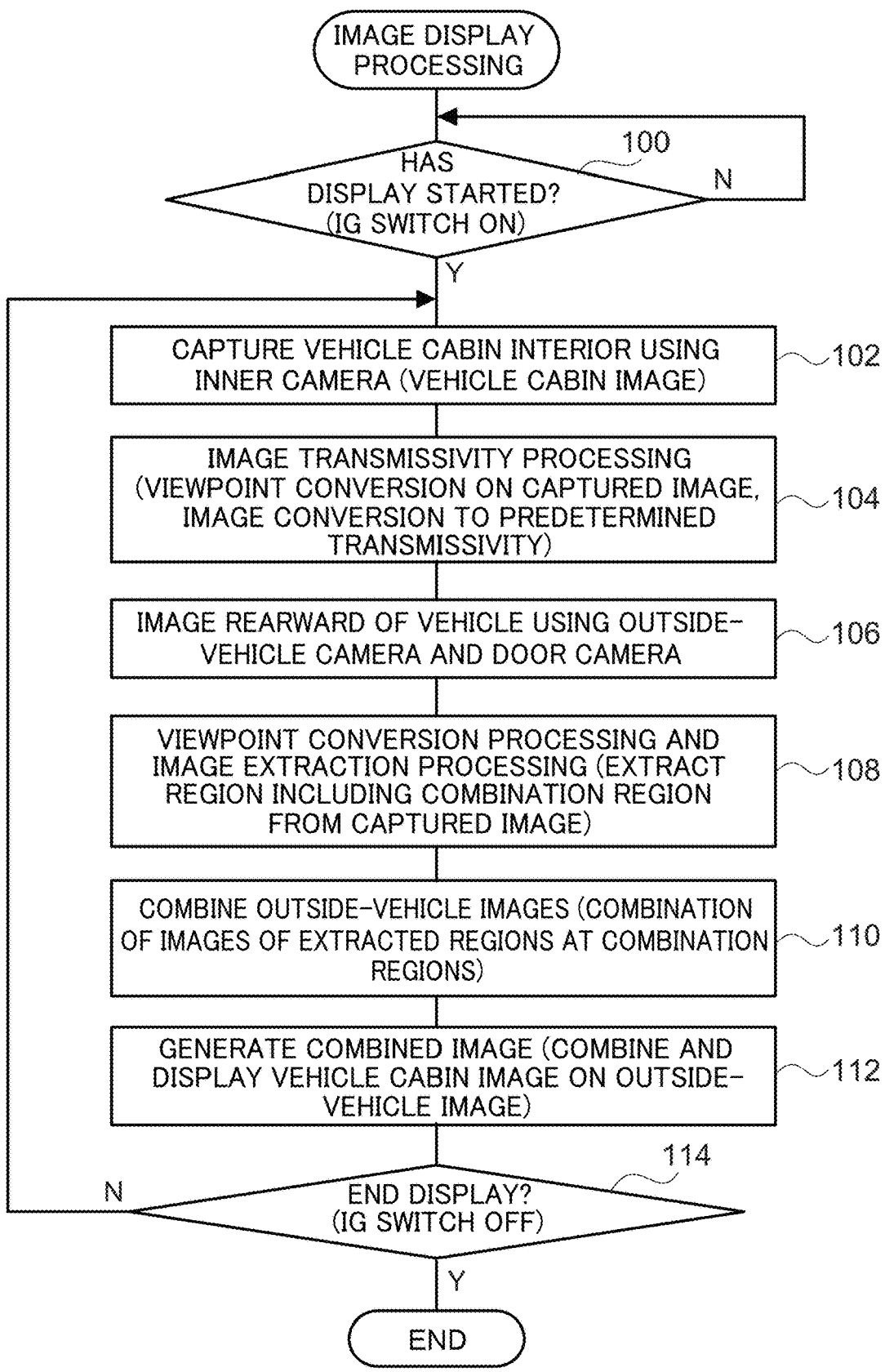
FIG. 4 is a flowchart illustrating image display processing according to an exemplary embodiment of the present disclosure.
Figure 5A:
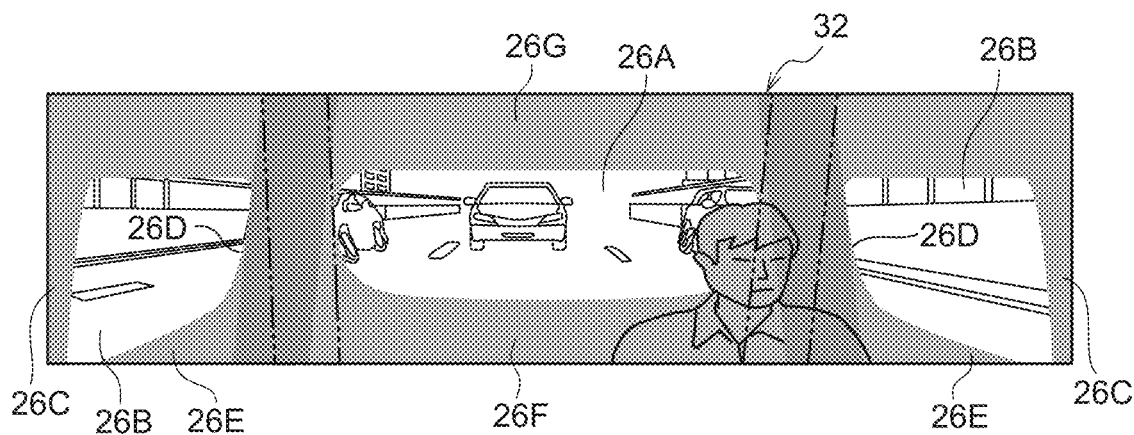
FIG. 5A is a schematic diagram illustrating a vehicle cabin image.
Figure 5B:
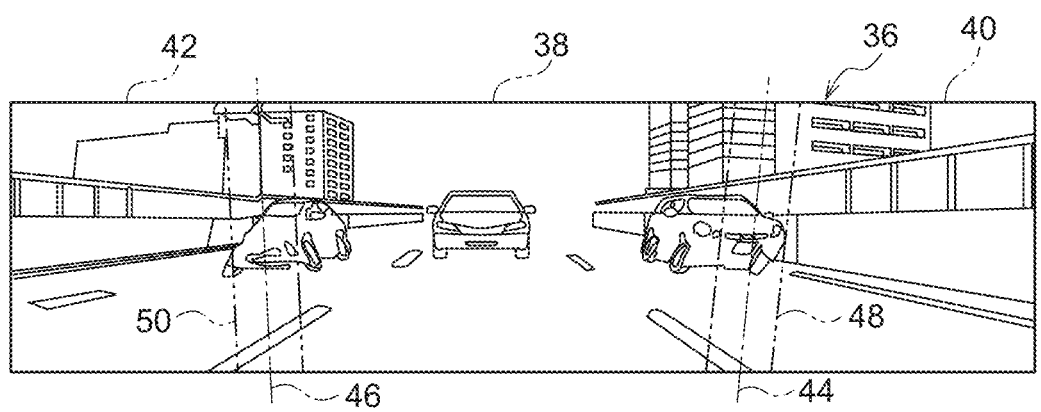
FIG. 5B is a schematic diagram illustrating outside-vehicle images.
Figure 5C:
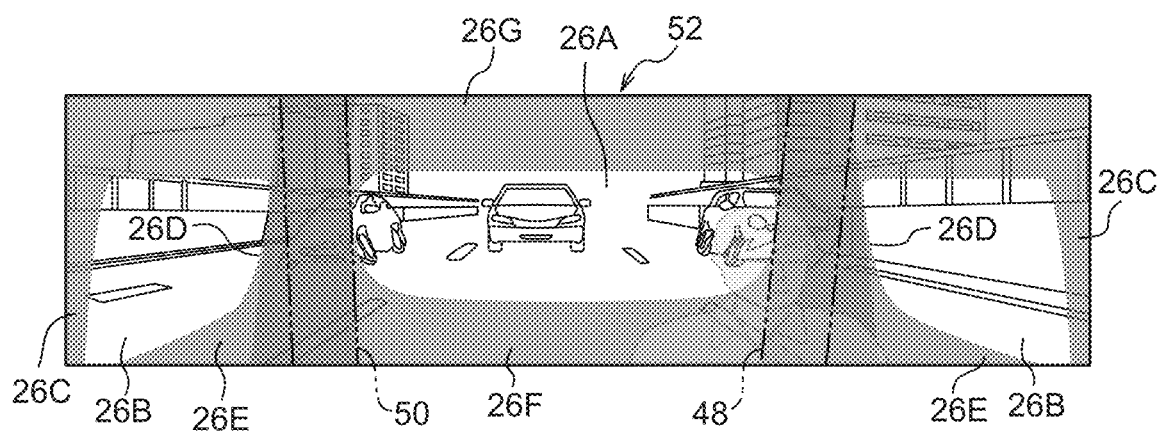
FIG. 5C is a schematic diagram illustrating a combined image.

Next, specific processing performed by the control device 28 of the vehicular visual recognition device 10 is described as operation of the present exemplary embodiment. FIG. 4 illustrates display processing (image display processing) of a combined image on the monitor 22 as a flowchart. Further, FIG. 5A to FIG. 5C illustrate an image generated by the control device 28 as a schematic diagram. FIG. 5A illustrates the vehicle cabin image 32. FIG. 5B illustrates the outside-vehicle image 36. FIG. 5C illustrates a combined image 52 as a combined image. Note that FIG. 5A to FIG. 5C are illustrated such that the images are left-right inverted with respect to the captured images.

In the vehicular visual recognition device 10, image display on the monitor 22 is started when an ignition switch (IG), not illustrated, of the vehicle 12 is switched ON. Note that in switching between display and non-display on the monitor 22, a switch that switches between display and non-display on the monitor 22 may be provided to the vehicular visual recognition device 10, and the monitor 22 may function as an interior rearview mirror (half mirror) with image display on the monitor 22 starting by switching the switch to ON and image display on the monitor 22 and ending by switching the switch to OFF.

In the flowchart of FIG. 4, at the first step 100, whether or not the ignition switch of the vehicle 12 is ON is confirmed, and if the ignition switch is ON, affirmative determination is made at step 100 and processing transitions to step 102. At step 102, a captured image of inside the cabin captured by the inner camera 24 is read. At the next step 104, viewpoint conversion processing (including trimming processing) is performed on the captured image that was read, and conversion processing to a preset transmissivity is performed. When this is performed, in the vehicle cabin image 32, the transmissivity for image portions of at least the vehicle body components that overlap with the combination regions 48 and 50 is set lower than the transmissivity of surroundings thereof.

The vehicle cabin image 32 illustrated in FIG. 5A is thereby obtained. In the vehicle cabin image 32, the transmissivity of an image of the rear pillars 26D is set lower than the transmissivity of an image of the surroundings thereof. Further, in the vehicle cabin image 32, the transmissivities of the portions of the image of the vehicle cabin interior ceiling 26G at the upper side of the rear pillars 26D, and the portions of the images of the rear side doors 26E and the image of the rear seat 26F at the lower side of the rear pillars 26D are lowered similarly to the rear pillars 26D. Note that an occupant aboard the vehicle 12 may be captured by the inner camera 24 and the transmissivity of the image of the occupant may be lowered similarly to the rear pillars 26D in cases in which the image of the occupant overlaps with an image having lowered transmissivity.

At step 106, the captured images respectively captured by the rear camera 14 and the door cameras 16L and 16R are read, and at the next step 108, viewpoint conversion processing is performed on the captured images that were read, and the captured images 34A, 34L, and 34R are generated. Further, at step 108, image extraction processing (trimming processing) and the like is performed on the captured images 34A, 34L, and 34R. This extracts the extracted image 38 that includes the combination regions 48 and 50 centered on the boundary lines 44 and 46, the extracted image 40 that includes the combination region 48 centered on the boundary line 44, and the extracted image 42 that includes the combination region 50 centered on the boundary line 46 (see FIG. 5B). Further, the extracted images 38, 40, and 42 are overlapped (combined) with each other in the combination regions 48 and 50, thereby generating the outside-vehicle image 36 in which the extracted images 38, 40, and 42 are stitched together. Note that the processing of steps 106 and 108 is executed in parallel with the processing of steps 102 and 104.

Subsequently, at step 110, the combined image 52 is generated in which an image of the rear pillars 26D of the vehicle cabin image 32 is overlapped on the combination regions 48 and 50 of the outside-vehicle image 36, and the outside-vehicle image 36 and the vehicle cabin image 32 are combined (see FIG. 5C). At step 112, the combined image 52 is displayed on the monitor 22. At step 114, whether or not the ignition switch is OFF is confirmed, and while the ignition switch is ON, affirmative determination is made at step 114 and the processing of step 102 to step 112 is repeated. Accordingly, on the monitor 22, the situation captured rearward of the vehicle by the rear camera 14 and the door cameras 16L and 16R is displayed on the monitor 22 together with the state of the vehicle cabin interior captured by the inner camera 24.

Here, since the vehicle cabin image 32 to be combined with the outside-vehicle image 36 is transmissive, the outside-vehicle image 36 is visible through the vehicle cabin image 32 in the combined image 52 displayed on the monitor 22. The combined image 52 displayed on the monitor 22 can accordingly assist visual recognition by an occupant in the vehicle cabin. However, when an occupant is aboard, the occupant is seen in the vehicle cabin image 32 since the vehicle cabin image 32 employs the captured image captured by the inner camera 24. This enables the state of the vehicle cabin interior to be displayed on the monitor 22 and can suppress the occurrence of a disturbed feeling caused by occupants inside the cabin not being displayed on the monitor 22.

Further, in the outside-vehicle image 36, although distortion occurs in images of objects (imaging subjects) in the combination regions 48 and 50, which are portions of overlap between the extracted image 38 and the extracted images 40 and 42, the rear pillars 26D of the vehicle cabin image 32 are overlapped on the combination regions 48 and 50. Accordingly, in the combined image 52, the images of the combination regions 48 and 50 are discernable through the image of the rear window glass 26A of the vehicle cabin image 32 and the image of the door glass 26B, and are only discernable through the rear pillars 26D. Accordingly, the images of the combination regions 48 and 50 are difficult to discern in the combined image 52, and although there is distortion in the images of the combination regions 48 and 50, a detrimental effect on the appearance of the combined image 52 displayed on the monitor 22 is suppressed. However, in the vehicle cabin image 32, the transmissivity of the image of the rear pillars 26D is set lower than the transmissivity of the image of the surroundings thereof such that the images of the combination regions 48 and 50 are harder to discern than images other than the image of the rear pillars 26D, and distortion in the images of the combination regions 48 and 50 can be suppressed from having a detrimental effect on the appearance of the combined image 52 displayed on the monitor 22.

Although the combination regions 48 and 50 overlap with the images of the rear pillars 26D, the rear seat 26F, and the vehicle cabin interior ceiling 26G in the vehicle cabin image 32 in the present exemplary embodiment, it is sufficient for vehicle body portions of the vehicle cabin image 32 to overlap with at least part of the combination regions 48 and 50. This makes the image of the combination regions 48 and 50 harder to discern in regions overlapping with the vehicle body portions of the vehicle cabin image 32 than in images overlapping with the rear window glass 26A and the door glass 26B, thereby enabling a detrimental effect on the appearance of the combined image 52 displayed on the monitor 22 to be suppressed. However, in the vehicle cabin image 32, since the transmissivities of the images of the vehicle body portions that overlap with the images of the combination regions 48 and 50 are lowered to less than the transmissivities of images of the surroundings thereof, the images of the combination regions 48 and 50 that overlap with the images of the vehicle body portions can be made harder to discern and distortion of the image of the combination regions 48 and 50 away from the images of the vehicle body portions can be made harder to discern. This enables a sense of a detrimental effect on the appearance of the combined image 52 displayed on the monitor 22 to be suppressed.

Further, although the transmissivity is lowed in the images of the rear pillars 26D and the like that overlap the images of the combination regions 48 and 50 of the outside-vehicle image 36, the vehicle cabin image 32 is not limited thereto. The transmissivity of the images of the rear pillars 26D and the like may be set the same as the transmissivity of other images. In such cases, due to the image of the vehicle body portions (the rear pillars 26D) in the vehicle cabin image 32 overlapping with the images of the combination regions 48 and 50 in the outside-vehicle image 36, the images of the regions of the combination regions 48 and 50 can be made harder to discern than the surrounding images (the images that overlap with the rear window glass 26A and the door glass 26B), enabling the images of the combination regions 48 and 50 to be suppressed from having a detrimental effect on the appearance of the combined image 52 displayed on the monitor 22.

Figure 6:
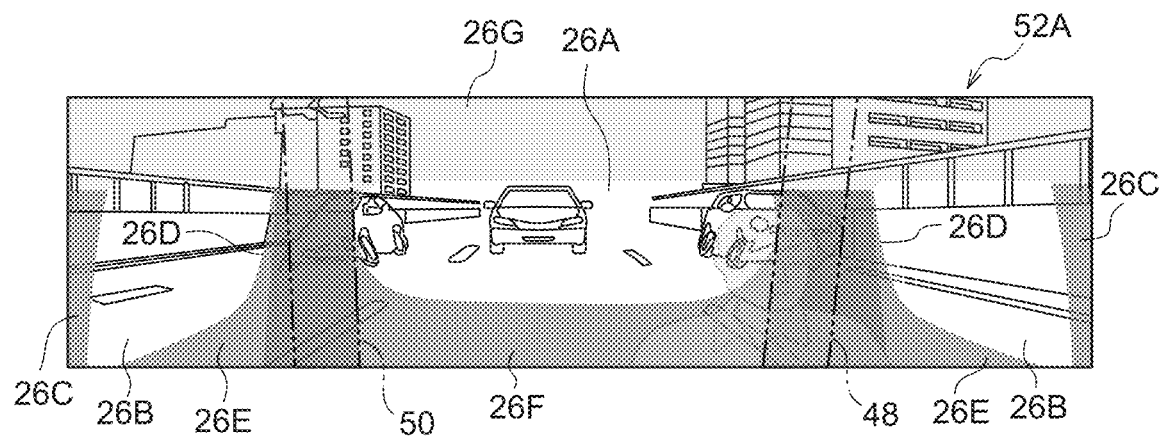
FIG. 6 is a schematic diagram illustrating another example of a combined image.

Furthermore, in the vehicle cabin image 32, the transmissivity of images of vehicle body portions at the upper side (for example, the vehicle cabin interior ceiling 26G above an upper end of the rear window glass 26A) may be set higher than that of vehicle body portions at the lower side (such as the rear pillars 26D and the rear seat 26F below the upper end of the rear window glass 26A), and may be a transmissivity of 100% (a state in which the image of the vehicle cabin interior ceiling 26G is not visible). FIG. 6 illustrates a combined image 52A in which, in the vehicle cabin image 32, the transmissivity of the vehicle cabin interior ceiling 26G is higher than the transmissivity of the images of surrounding vehicle body portions.

In the combined image 52A setting the transmissivity of the image of the vehicle cabin interior ceiling 26G high makes the outside-vehicle image 36 easy to discern and improves visual recognition rearward of the vehicle. Further, the view outside the vehicle beyond the vehicle cabin interior ceiling 26G is often the sky (clouds) or the like, and so even if distortion occurs in the image of the combination regions 48 and 50 it is difficult to discern the occurrence of any distortion. Thus, in the combined image 52A, distortion occurring in the images of the combination regions 48 and 50 can be suppressed from having a detrimental effect.

Further, in the vehicle cabin image 32, the transmissivities are set lower for the image of the rear pillars 26D that overlaps with the combination regions 48 and 50, portions of the images of the rear side doors 26E at the lower side of the rear pillars 26D, portions of the image of the rear seat 26F at the lower side of the rear pillars 26D, and portions of the image of the vehicle cabin interior ceiling 26G at the upper side of the rear pillars 26D than the transmissivity of the images of the surroundings thereof. However, the portion set with low transmissivity may be a portion overlapping at least the combination regions 48 and 50. Further, configuration may be made such that the transmissivities of portions overlapping the combination regions 48 and 50 are set low, and the transmissivity gradually rises on progression away from the combination regions 48 and 50 so as to change to the transmissivity of the images of the surroundings thereof.

Further, in the description of the present exemplary embodiment, although widths were given to the combination regions 48 and 50, there is no limitation thereto. The widths of the combination regions 48 and 50 may be eliminated and the extracted image 38 may be stitched together and combined with the extracted image 40 and the extracted image 42 at the boundary lines 44 and 46. In such cases, the image changes so as to transition at the boundary lines 44 and 46 in the outside-vehicle image 36; however, the image of vehicle body portions of the vehicle cabin image 32 overlap with the boundary lines 44 and 46 in the combined image 52. Thus, the transition in the image at the boundary lines 44 and 46 can be made harder to discern and detrimental effects to the combined image 52 displayed on the monitor 22 can be suppressed.

On the other hand, the positions of the boundary lines 44 and 46 and the widths of the combination regions 48 and 50 may be variable. Making at least one out of the positions of the boundary lines 44 and 46 or the widths of the combination regions 48 and 50 variable enables visual recognition of images that had been difficult to discern (objects outside the vehicle). Thus, the ability to visually recognize objects in the combined image 52 displayed on the monitor 22 can be improved, enabling the occupant to be assisted in visual recognition of the combined image 52 displayed on the monitor 22.

Furthermore, changes to the positions of the boundary lines 44 and 46 in the outside-vehicle image 36, changes to the widths of the combination regions 48 and 50 in the outside-vehicle image 36, and the like may be made in accordance with the traveling state of the vehicle 12. In cases in which changes are made to the position of the boundary lines 44 and 46 or the widths of the combination regions 48 and 50 in the outside-vehicle image 36 in accordance with the traveling state of the vehicle 12, the positions of the boundary lines 44 and 46 are moved more toward the inside in the vehicle width direction in the outside-vehicle image 36, or the widths of the combination regions 48 and 50 are made narrower at high speed than at low speed. This enables distortion of the images of the combination regions 48 and 50 to be suppressed from having a detrimental effect on the appearance of the combined image 52 since at least part of the boundary lines 44 and 46 and the combination regions 48 and 50 overlaps with the images of the vehicle body portion of the vehicle cabin image 32 in the combined image 52. Further, when traveling at high speed, the ability to visually recognize images in the regions at the sides of the vehicle 12 that are close to the vehicle 12 can be improved.

Note that in the present exemplary embodiment, the captured image (video) from the inner camera 24 is employed as the vehicle cabin image. However, the vehicle cabin image may be a captured image of the vehicle cabin interior captured in advance, for example, during manufacturing, shipping, or the like of the vehicle at a factory, or may be a still image employing a captured image that was captured before the vehicle started traveling. Further, the vehicle cabin image is not limited to captured images captured by an imaging unit, and may employ a drawn illustration or the like of the vehicle cabin interior.

In cases in which a captured image captured in advance or an illustration or the like produced in advance is employed as the vehicle cabin image, the inner camera 24 may be employed or a captured image captured by an imaging unit (camera) other than the inner camera 24 may be employed. Further, in cases in which a captured image captured in advance or an illustration or the like produced in advance is employed as the vehicle cabin image, the processing of steps 102 and 104 of the flowchart of FIG. 4 can be omitted, enabling an increase in processing load of the control device 28 for displaying the combined image on the monitor 22 to be suppressed. Furthermore, in cases in which a captured image captured in advance or an illustration or the like produced in advance is employed as the vehicle cabin image, the inner camera 24 can be omitted, enabling a reduction in cost of the vehicular visual recognition device 10.

Furthermore, an in-cabin image may employ a captured image of the vehicle cabin interior captured by the inner camera 24 together with a captured image captured in advance or an illustration produced in advance. In such cases, the vehicle cabin image produced in advance is stored in memory, and the pre-produced in-cabin image may be overlapped onto a vehicle cabin image produced in step 104 of the flowchart of FIG. 4. Further, in the pre-produced vehicle cabin image, making the transmissivity of portions corresponding to the combination regions 48 and 50 lower than the transmissivity of surroundings thereof enables the vehicle cabin image generated from the captured image from the inner camera 24 to be given uniform transmissivity. Furthermore, in cases in which the positions and widths of the combination regions 48 and 50 are made variable, a need to change the transmissivity of the captured image from the inner camera 24 in order to align the positions and widths of the combination regions 48 and 50 can be obviated by aligning the variable positions and widths of the combination regions 48 and 50 with each other and changing the transmissivity in the pre-produced vehicle cabin image. This enables the display processing for the combined image to be simplified.

Further, the present exemplary embodiment described above employed three imaging units as imaging sections: the rear camera 14 and the door cameras 16L and 16R. However, the imaging sections may be imaging units (cameras) provided to outside-vehicle surfaces of the vehicle 12 such as a front door, center pillar, or front fender of the vehicle 12.

Further, the number of imaging units employed as imaging sections may be two or four or more imaging units as long as portions of the imaging regions overlap. Accordingly, the imaging sections may include one imaging unit provided at each vehicle width side of a vehicle rear section (for example, each side of the rear bumper) for imaging rearward of the vehicle, as long as the imaging units are disposed such that the imaging regions include regions for which display on the monitor 22 is desired.

Further, although rearward of the vehicle is imaged in the present exemplary embodiment, there is no limitation thereto. The vehicular visual recognition device may be configured to image sideways of the vehicle 12 or the forward of the vehicle 12 using an imaging section and display the captured image at a display section. In such cases, the vehicle cabin image can apply a vehicle cabin image, illustration, or the like obtained by imaging the vehicle cabin interior facing toward the imaging region of the imaging section from inside the vehicle cabin at the opposite side of the vehicle cabin to the direction of imaging by the imaging section.

Although an example of the present disclosure has been described above, the present disclosure is not limited to this description. It is obvious that in addition to the above, various modifications can be implemented within a range not departing from the spirit of the present disclosure.

What is claimed is:

1. A vehicular visual recognition device, comprising:
an imaging section that, from outside a vehicle, captures a plurality of vehicle exterior capture images in which portions of the images overlap with each other, and from inside the vehicle, captures a vehicle cabin image that includes an image of window glass and opaque vehicle body portions; and
a controller that generates combination images resulting from overlapping the plurality of vehicle exterior capture images with each other at overlapping portions, superimposes the vehicle cabin image sotto a predetermined transmissive state with each of the overlapping portions; and confines within an area of the image of an opaque vehicle body portion in the vehicle cabin image each of the overlapping portions,
wherein the plurality of vehicle exterior capture images and the vehicle cabin image are combined and displayed at a display section such that a perception of distortion in the overlapping portions is suppressed.

2. The vehicular visual recognition device of claim 1, wherein, in the vehicle cabin image, a vehicle cabin interior is captured in a direction corresponding to a capture direction of the imaging section so as to include window glass and the opaque portion of a vehicle body.

3. The vehicular visual recognition device of claim 1, wherein, in the vehicle cabin image, a transmissivity of the image of the opaque vehicle body portion is set lower than a transmissivity of an image of surroundings of the opaque vehicle body portion.

4. The vehicular visual recognition device of claim 1, wherein the image of the opaque vehicle body portion of the vehicle cabin image is overlapped with an entire area along an up-down direction of an overlapping portion of the vehicle exterior capture images.

5. The vehicular visual recognition device of claim 1, wherein the image of the vehicle body portion is an image of a pillar in contact with window glass.

6. The vehicular visual recognition device of claim 5, wherein the image of the pillar is overlapped with an entire area along a direction intersecting an up-down direction of an overlapping portion of the vehicle exterior capture images.

7. The vehicular visual recognition device of claim 1, wherein, in the vehicle cabin image, a transmissivity of the image of the opaque vehicle body portion further to an upper side than an up-down direction intermediate portion of the vehicle cabin image is higher than a transmissivity of the image of the opaque vehicle body portion further to a lower side than the up-down direction intermediate portion of the vehicle cabin image.

8. The vehicular visual recognition device of claim 1, wherein the controller effects control such that the vehicle cabin image and the plurality of vehicle exterior capture images are displayed at the display section as images that are left-right inverted with respect to captured images.

9. The vehicular visual recognition device of claim 8, wherein the display section is an interior rearview mirror provided in a vehicle cabin, and the controller effects control so as to perform display such that a position of an object in a rearward field of view that is reflected when the interior rearview mirror is not displaying the vehicle cabin image or the plurality of vehicle exterior capture images, and a position of the object on the image displayed when the interior rearview mirror is displaying the vehicle cabin image and the plurality of vehicle exterior capture images, are positionally aligned at the display section.

10. A method of displaying a vehicular visual recognition image, the method comprising:
capturing, from outside a vehicle, a plurality of vehicle exterior capture images in which portions of the images overlap with each other, using an imaging section;
generating a vehicle cabin image that includes an image of window glass and opaque vehicle body portions in a predetermined transmissive state;
generating combination images resulting from overlapping the plurality of vehicle exterior capture images with each other at overlapping portions,
superimposing the vehicle cabin image set to the redetermined transmissive state with each of the overlapping portions; and
confining within an area of the image of an opaque vehicle body portion in the vehicle cabin image each of the overlapping portions; and
all of the overlapping portions displaying the combined image at a display section such that a perception of distortion in the overlapping portions is suppressed.

11. The vehicular visual recognition device of claim 1, wherein the controller selects the location of the combination images such that the combination images from overlapping portions of the plurality of vehicle exterior capture images will be completely covered by the opaque vehicle body portion of the vehicle cabin image in the combination of images displayed at the display section.

12. The method of displaying a vehicular visual recognition image of claim 10, further including the step of selecting the location of the combination images such that the combination images from overlapping portions of the plurality of vehicle exterior capture images will be completely covered by the opaque vehicle body portion of the vehicle cabin image in the combination of images displayed at the display section.

* * * * *